(12) United States Patent
    Viasnoff

(10) Patent No.: US 8,623,499 B2
(45) Date of Patent: Jan. 7, 2014

(54) THIN FILMS INCLUDING NANOPARTICLES WITH SOLAR REFLECTANCE PROPERTIES FOR BUILDING MATERIALS

(75) Inventor: Emilie Viasnoff, Sevres (FR)

(73) Assignee: Certainteed Corporation, Valley Forge, PA (US)

( * ) Notice: Subject to any disclaimer, the term of this patent is extended or adjusted under 35 U.S.C. 154(b) by 0 days.

(21) Appl. No.: 12/862,449

(22) Filed: Aug. 24, 2010

(65) Prior Publication Data

US 2011/0123788 A1 May 26, 2011

Related U.S. Application Data

(63) Continuation of application No. PCT/IB2009/007020, filed on Aug. 24, 2009.

(51) Int. Cl.
  *B32B 27/32* (2006.01)
  *B32B 9/00* (2006.01)
  *B05D 7/00* (2006.01)

(52) U.S. Cl.
  USPC .................. 428/220; 428/469; 427/419.2

(58) Field of Classification Search
  None
  See application file for complete search history.

(56) References Cited

U.S. PATENT DOCUMENTS

| 7,241,500 B2 | 7/2007 | Shiao et al. | |
| 2003/0148093 A1 | 8/2003 | Gorny et al. | |
| 2003/0152747 A1* | 8/2003 | Fensel et al. | 428/143 |
| 2004/0180220 A1* | 9/2004 | Gueneau et al. | 428/446 |
| 2004/0251451 A1* | 12/2004 | Burgard et al. | 252/520.1 |
| 2005/0072110 A1 | 4/2005 | Shiao et al. | |
| 2006/0034065 A1* | 2/2006 | Thurk | 362/84 |
| 2007/0036962 A1* | 2/2007 | Sasaki et al. | 428/292.1 |
| 2007/0077361 A1 | 4/2007 | Shiao et al. | |
| 2008/0241472 A1* | 10/2008 | Shiao et al. | 428/144 |
| 2009/0279004 A1* | 11/2009 | Greenall et al. | 349/16 |
| 2010/0298515 A1* | 11/2010 | Marchand et al. | 526/336 |

FOREIGN PATENT DOCUMENTS

| EP | 0 548 822 A2 | 6/1993 |
| EP | 1 916 352 A2 | 4/2008 |
| WO | WO 01/98818 A2 | 12/2001 |
| WO | WO 08/147972 A2 | 12/2008 |

OTHER PUBLICATIONS

Material Data Sheet for TiO2 (Rutile). Crystan, Ltd. 2012©.*
Material Data Sheet for Polymethacrylate. Sigma-Aldrich. 2012 © http://www.sigmaaldrich.com/life-science/biochemicals/biochemical-products.html?TablePage=15929475.*

* cited by examiner

*Primary Examiner* — David Sample
*Assistant Examiner* — Nicole T Gugliotta
(74) *Attorney, Agent, or Firm* — Woodcock Washburn LLP

(57) ABSTRACT

Disclosed are solar-reflective building materials, including roofing articles, that include nanoparticle-containing thin films; such articles display high reflectance of near-infrared radiation and high transmission of radiation in the visible light range so as to reduce the heat island effects experienced by the articles while also maintaining an aesthetically pleasing appearance. Also disclosed are related methods of fabricating such articles.

30 Claims, 2 Drawing Sheets

THIN FILMS INCLUDING NANOPARTICLES WITH SOLAR REFLECTANCE PROPERTIES FOR BUILDING MATERIALS

RELATED APPLICATIONS

This application is a continuation, filed under 35 U.S.C. §365, of International Patent Application No. PCT/IB2009/007020, filed Aug. 24, 2009, the entirety of which is incorporated herein for all purposes.

FIELD OF THE INVENTION

The present invention relates to the fields of building materials and to solar-reflecting thin films, including nanoparticles.

BACKGROUND OF THE INVENTION

Sloped roofs are typically covered with mineral-surfaced asphalt shingles, such as those described in ASTM D225 ("Standard Specification for Asphalt Shingles (Organic Felt) Surfaced with Mineral Granules") or D3462 ("Standard Specification for Asphalt Shingles Made From Glass Felt and Surfaced with Mineral Granules"), to provide a water-shedding function while adding an aesthetically pleasing appearance to the roofs.

Such asphalt shingles are normally made from asphalt-impregnated fabrics. The shingles also typically include colored roofing granules to provide aesthetically pleasing coloration to the shingles as well as to impart strength and durability to the shingles. The roofing granules are typically also used in asphalt-based roofing articles to help protect the asphalt from the effects of incident ultraviolet radiation.

It is known in the art, however, that conventional roofing materials, such as the described asphaltic shingles, reflect little near-infrared ("NIR" radiation; λ=about 700 nm to about 2500 nm) radiation and consequently absorb substantial solar heat. This absorption increases with dark-colored shingles; while white or lighter-colored asphalt shingles may have a solar reflectance in the range of about 25% to about 35%, dark-colored asphalt shingles may have a solar reflectance of only about 5 to about 15%. This comparatively high absorption of solar heat typically results in elevated temperatures in the environment surrounding the shingle.

This elevation in temperature in turn results in so-called heat-island effects that increase the need for energy-consuming cooling systems. The heat-island effects of the solar heat absorption of a dark-colored roofing article can be significant—temperatures as high as 77° C. have been observed on the surface of black roofing shingles on a sunny day having an ambient temperature of only about 21° C.

Several efforts have been made to address the issues raised by the described heat-island effects. Some efforts include incorporation of application of white- or light-colored pigments or coatings directly to roofing articles to enhance the articles' reflectivity. Consumers of roofing materials, however, have shown a marked aesthetic preference for black or dark-colored roofing articles.

Others have proposed roofing articles or granules having metal flakes, such as aluminum flakes, adhered to their surfaces, to provide a radiation-reflective surface. These approaches, however, impart reflectivity to the roofing article and result in articles that are not aesthetically pleasing to consumers.

Others have proposed the use of pigments dispersed in a polymer matrix to reflect NIR and reduce heat island effects. However, such use of pigments introduces aesthetically undesirable haze into the finished article due to light scattering.

Accordingly, there is an ongoing need in the field for improved roofing materials that possess desirable NIR reflectance characteristics while also presenting an aesthetically pleasing appearance. There is also a related need for processes capable of producing such improved roofing materials.

SUMMARY OF THE INVENTION

In meeting the challenges described above, the present invention provides roofing articles comprising substrates at least partially surmounted by at least one thin film having an average thickness in the range of from about 10 nm to about 5000 nm, the at least one thin film comprising at least one population of nanoparticles residing in a matrix, at least one of the population of nanoparticles having at least one characteristic dimension in the range of from about 10 nm to about 500 nm, the at least one thin film transmitting from about 5% to about 100% of radiation having a wavelength of between about 300 nm and about 700 nm (so-called "visible light"), the article reflecting at least about 20% of radiation having a wavelength of between about 700 nm and about 2500 nm.

Also provided are related methods of fabricating roofing articles, the methods comprising disposing onto at least a portion of a substrate at least one thin film having an average thickness in the range of from about 10 nm to about 5000 nm, the at least one thin film comprising at least one matrix and a population of nanoparticles, at least one nanoparticle having at least one average characteristic dimension in the range of from about 10 nm to about 500 nm, the at least one thin film transmitting from about 5% to about 100% of radiation having a wavelength of between about 300 nm and about 700 nm, the article with thin film reflecting at least about 20% of radiation having a wavelength of between about 700 nm and about 2500 nm.

Additionally provided are opaque building materials, comprising a substrate at least partially surmounted by at least one thin film having an average thickness in the range of from about 10 nm to about 5000 nm, the at least one thin film comprising at least one population of nanoparticles residing in a matrix, at least one of the population of nanoparticles having at least one characteristic dimension in the range of from about 10 nm to about 500 nm, the at least one thin film transmitting at least about 5% of radiation having a wavelength of between about 300 nm and about 700 nm, and the at least one thin film reflecting at least about 20% of radiation having a wavelength of between about 700 nm and about 2500 nm.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
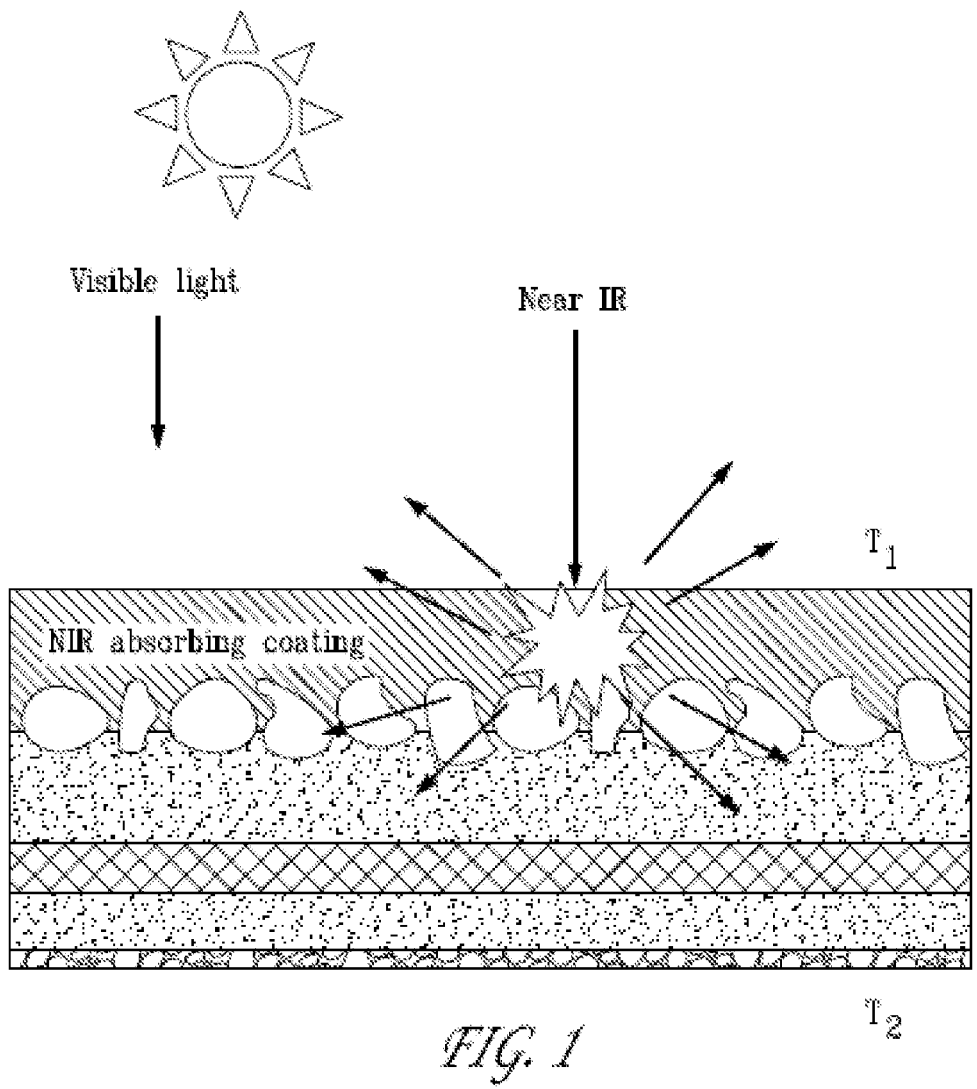
FIG. 1 depicts a schematic view of the operation of the disclosed roofing articles.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

In a first aspect, the present invention provides roofing articles at least partially surmounted by at least one thin film having an average thickness in the range of from about 10 nm to about 1000 nm, 5000 nm, or even up to about 10,000 nm. The thin film suitably includes a population of nanoparticles residing in a matrix, and one or more of the nanoparticles suitably has at least one characteristic dimension in the range of from about 10 nm to about 500 nm.

The at least one thin film suitably transmits from about 5% to about 100% of radiation having a wavelength of between about 300 nm and about 700 nm, and the article suitably reflects at least about 20% of radiation having a wavelength of between about 700 nm and about 2500 nm. The article with thin film also suitably absorbs less than about 60% of radiation having wavelength of between about 300 nm and 2500 nm, or even less than about 50% of radiation in that range of wavelengths.

The articles also suitably have an emissivity of from about 75% to about 100% in the middle-IR range, from about 85% to about 95%, or even an emissivity of about 90%. Such substantial emissivity enables roofing materials made according to the claimed invention to at least partially avoid the "heat island" effect that can arise in sunny weather, as described elsewhere herein.

In some embodiments, the thin film has an average thickness in the range of from about 20 nm to about 500 nm, or in the range of from about 50 to about 100 nm. The optimal thickness of the thin film will depend on the needs of the user and will be easily determined by those having ordinary skill in the art. It is preferable that the thin film be at least as thick as a characteristic dimension of the nanoparticles, such that the nanoparticles are contained or embedded within the matrix.

The nanoparticles may be present in a weight percentage (relative to the overall thin film coating) of from about 5% to about 95%, of from about 30% to about 70%, or even about 50%. The optimal relative amount of nanoparticles will depend on the desired performance of the final roofing article, the nanoparticles and matrix material being used, and other factors that the user of ordinary skill in the art will readily determine. The optimal amount of nanoparticles may also depend on whether the thin films are deposited directly on granules or directly on roofing materials; the user of ordinary skill in the art will encounter little difficulty in determining the optimal amount of nanoparticles to use.

In some embodiments, the thin film is capable of transmitting from about 50% to about 100% of radiation having a wavelength in the range of from 300 nm to about 700 nm, i.e., visible light, or even from about 80% to about 90% of radiation in that range of wavelengths.

Suitable matrix materials preferably transmit at least about 5% of light in the visible spectrum, and are preferably transparent to visible light. Polymers, silicas, silicates, phosphates, and the like (including mixtures of these materials) are suitable matrix materials. The matrix may include a binder or other adhesive to maintain nanoparticle incorporation in the matrix and to lend structural stability and strength to the finished article.

There is suitably some differential between the refractive index of the nanoparticles within the matrix and the index of the matrix itself. The nanoparticles and matrix may be selected such that the refractive index of the nanoparticles is greater than that of the matrix.

This differential may be achieved by choosing a matrix material that is porous; in general, the more porous the matrix material, the lower the effective refractive index of the material. The differential between the nanoparticles and of the matrix is suitably nonzero and is at least 0.5 or at least 1, but may be 1.5, 2, 2.5, or even higher, depending on the materials used.

The concentration of nanoparticles within the matrix will vary with the user's needs and desired performance. Determination of the optimal concentration of nanoparticles will be achieved by those of ordinary skill in the art.

The articles suitably absorb less than about 50% of radiation having a wavelength in the range of from about 700 nm to about 2500 nm, or even less than about 25% of radiation in that range of wavelengths. The sum of the thin film's percentage transmission of radiation having a wavelength of between about 300 nm and about 700 nm and the thin film's percentage reflectance of radiation having a wavelength of between about 700 nm and about 2500 nm is suitably greater than about 50%.

In other embodiments, the at least one thin film reflects at least about 50% of radiation having a wavelength of between about 700 nm and about 2500 nm. In other embodiments, the thin film reflects at least about 75% of radiation in that range, or even more than about 85% of radiation in that range. The article as a whole may also reflect at least about 50% of such radiation, or even at least about 75% of such radiation.

Various items can serve as suitable substrates for the claimed roofing articles. Suitable substrates include, inter alia, granules, shingles, roofing membranes, shakes, tiles, coil stock, or any combination thereof.

As shown in non-limiting FIG. 1, the thin films may be disposed atop a layer of roofing granules that are themselves disposed atop a shingle or other substrate. The substrates may be asphaltic or bituminous in nature, and standard roofing materials known in the art are considered suitable substrates for the present roofing articles.

While FIG. 1 shows a coating that covers a substrate and granules in their entirety, it is to be understood that the coating need not be so disposed. In some embodiments, the film covers less than all granules that may be present on a roofing material. In some embodiments, the film covers only a portion of the surface area of a particular granule or granules.

Similarly, the film need not cover all of a particular substrate; the film may cover only a portion of the substrate. The inventive materials need not include granules, and the use of granules will be dictated by the needs of the user or by other design considerations.

The substrates may be sealed before application of the thin films. For example, an asphaltic substrate may have a layer of sealant applied before application of the thin film.

Granules used in the present invention are typically chemically inert materials, such as mineral particles, and are generally between sand and gravel in size, i.e., between about #8 U.S. mesh and #70 U.S. mesh, and more preferably with sizes ranging from #8 U.S. mesh to #40 U.S. mesh. Preferably, the mineral particles have an average particle size of from about 0.2 mm to about 3 mm, and more preferably from about 0.4 mm to about 2.4 mm.

In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as recycled or manufactured materials such as proppant bodies, crushed bricks, concrete, porcelain, fire clay, and the like. Slate, feldspathic rock, plagioclase rock, chert rock, aluminum oxide, mullite, ceramic grog, crushed porcelain, white-pigmented glass, copper, and zinc are also considered suitable; such materials may possess solar-reflective characteristics. Other types of cores can also be used, provided that they have similar size range, adequate crush strength to endure the manufacturing process of shingle making, and have suitable durability for roofing environments. Granules of essentially any shape—including spherical, plate-shaped, and cubic granules—are suitable for use the present invention.

The thin films include nanoparticles of a single shape or of a variety of shapes. Nanoparticles may be spherical, cylindrical, oblong, acicular, ovoid, cubic, or otherwise polygonal in shape. Nanotubes may be used in the thin films of the claimed articles. Nanoparticles may be chosen on the basis of their dimensions; a cylindrical nanoparticle having characteristic dimensions of 50 nm and 100 nm is capable of scattering light of two different wavelengths.

The thin films may contain a homogeneous population of nanoparticles—e.g., a population of nanoparticles of the same size and composition—or a heterogeneous population of nanoparticles. As one non-limiting example, a thin film may include a dispersion of nanoparticles having a variety of characteristic dimensions or comprising a variety of materials, or both. Mixtures of cylindrical nanoparticles with nanoparticles of other shapes are within the scope of the claimed articles.

The nanoparticles are typically solid in structure, although nanoparticles may also be hollow, depending on the needs of the user. Nanoshells, which are known in the art, are considered suitable for dispersion within the thin films of the claimed invention.

Suitable nanoparticles may include high-index materials, metals, metal oxides, conducting materials, semiconducting material, and the like. Suitable metals include, e.g., aluminum, silver, gold, and the like. Metal alloys are also considered suitable nanoparticle materials.

Suitable metal oxides include tin, indium, zinc, and others. Suitable metal oxides and doped metal oxides include, e.g., $SnO_2$:F, $In_2O_3$:Sn, ZnO:Al, $LaB_6$, and the like. In general, conductive (or semi-conductive) nanoparticles are suitable for the claimed invention.

High-index materials used in the nanoparticles of the claimed invention suitably include materials having a refractive index of at least about 1.5 or even of about 2; $TiO_2$, and $Fe_2O_3$, are considered especially suitable materials. Materials with a refractive index of about 2.5 or greater are considered especially suitable, and finished roofing articles wherein the difference in refractive index between the plurality of nanoparticles and the matrix is at least about 1 are preferable. The population of nanoparticles (which particles may be of various shapes and configurations, including spheres, hollow spheres or shells, rods, and the like) dispersed in the matrix may be homogeneous, or may include particles of different sizes or types.

Without being bound to any one theory of operation, it is believed that conducting nanoparticles exhibit a particular absorption that is caused by excitation of surface plasmons by incident light; the collective oscillation of free electrons of nanoparticles can be in resonance with an incident electromagnetic field. For example, Mie scattering and Drude models of such behavior are considered useful predictors of such nanoparticle behavior.

The surface plasmon absorption of nanoparticles depends, at least in part, on the size of the nanoparticles, on the refractive index of the nanoparticles compared to the refractive index of the matrix, on the electrical conductivity of the nanoparticles, on the distance between nanoparticles, and on the shape of the nanoparticles. For conducting materials, such as aluminum, gold, and silver, the surface plasmon absorption is typically in the range of visible light.

As used in the present specification and claims, $L^*$ is a description of the lightness of an article's color, as set forth in the 1976 CIELAB $L^*a^*b^*$ color space, wherein $L^*=0$ signifies black and $L^*=100$ indicates diffuse white, negative values of $a^*$ signify green and positive $a^*$ values signify red/magenta, and negative values of $b^*$ signify blue and positive values of $b^*$ signify yellow.

Roofing articles according to the present invention suitably include at least one thin film selected so as to provide a roofing article with an $L^*$ value of less than about 85, although in some embodiments, the at least one thin film is selected so as to provide a roofing article with an $L^*$ value of less than about 85, or even less than about 65. The optimal $L^*$ for a particular article will be dictated by the needs or preferences of the user; as is known in the field, consumers exhibit a preference for comparatively dark roofing materials. Values of $L^*$, $a^*$, and $b^*$ for a particular article will be dictated by the preferences of the consumer or user. In some embodiments of the present invention, at least one of the $L^*$, $a^*$, and $b^*$ values of the nanoparticle-containing thin film may be matched to the corresponding value or values of the underlying substrate.

The roofing articles of the present invention may, in some embodiments, include sealants, binders, adhesives, and the like. Such materials may be useful to enhance the structural integrity of the articles, and may also enhance the binding between the thin films and the underlying surface. The binder may be present in the thin film, or may be applied separately. The articles may include algaecides, biocides, and the like to inhibit or prevent the growth of mosses, molds, fungi, or other organisms that may damage the roofing articles or impair their performance. Sealants, binders, and adhesives are known in the art and the optimal material will be apparent to the user of ordinary skill.

The thin films may itself be selected to provide additional properties to the roofing article. Such properties, include, e.g., hydrophobic properties, photocatalytic effects for self-cleaning, metallic visual effects, and the like.

The roofing articles may also include colorants, pigments, dyes, and the like. As a non-limiting example, pigments may be added to the matrix material to add a color effect.

The thin films may also contain multiple additives. For example, a thin film may include one or more pigments along with biocidal additives to provide a colored roofing article resistant to mold, fungus, algae or other biofilm development.

Clear or colored coatings may also be incorporated into the roofing articles, where needed. As one non-limiting example, a polymeric coating may be disposed atop at least a portion of a roofing article so as to provide mechanical or structural stability to the article. A non-limiting list of such coatings includes poly(meth)acrylates, polyurethanes, fluoropolymers, phosphates, titanates, zirconates, silicates—including metal silicates, silicas, and other polymers. Such coatings typically applied by spraying, sonic spraying, electrospraying, ink jet printing, roll coating, by extrusion coating, and other methods known to those of ordinary skill in the art.

The present invention also provides methods of fabricating roofing articles. These methods include disposing onto at least a portion of a substrate at least one thin film having an average thickness in the range of from about 10 nm to about 5000 nm, the at least one thin film comprising at least one matrix and a population of nanoparticles, at least one nanoparticle having at least one average characteristic dimension in the range of from about 10 nm to about 500 nm. The thin films and nanoparticles are suitably selected such that the resulting roofing article has an emissivity of at least about 75% in the medium-IR (wavelength>2500 nm) range.

The at least one thin film also suitably transmits from about 5% to about 100% of radiation having a wavelength of between about 300 nm and about 700 nm, and also suitably reflects at least about 20% of radiation having a wavelength of between about 700 nm and about 2500 nm. The article as a whole may also reflect at least about 20% of radiation having a wavelength of between about 700 nm and about 2500 nm. The thin films also suitably absorb less than about 60% of radiation having a wavelength of between about 300 nm and 2500 nm. The articles also suitably have an emissivity of from about 75% to about 100% in the middle-IR range, or from about 85% to about 95%, or even of about 90%. Such substantial emissivity enables roofing materials made according to the claimed invention to at least partially avoid the "heat island" effect that can arise in sunny weather, as described elsewhere herein.

Disposition of the at least one thin film onto the substrate is suitably accomplished by spraying, sol-gel spraying, electrospraying, laminating, fluidized bed processing, or any combination thereof.

Figure 2:
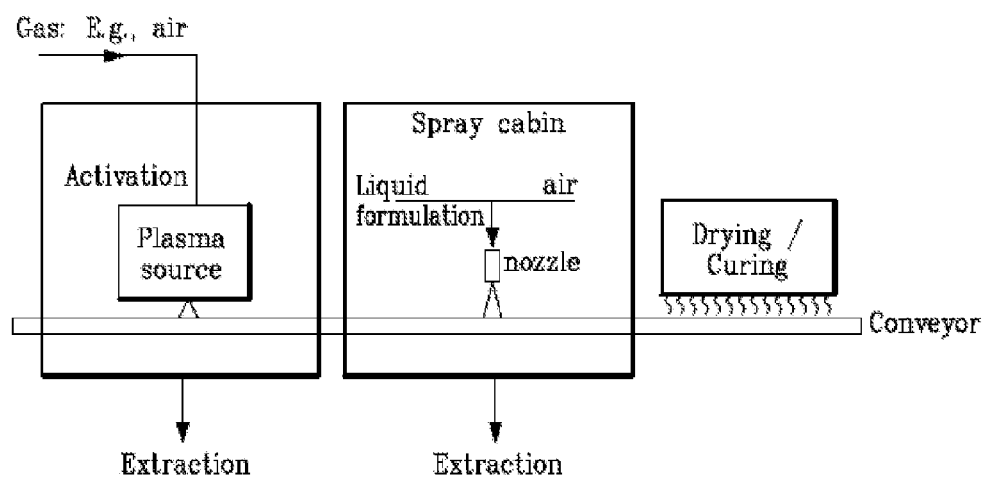
FIG. 2 depicts an exemplary, non-limiting sol-gel process for disposing a thin film atop a substrate to give rise to roofing articles according to the present invention.

One exemplary, non-limiting deposition process according to the claimed invention is shown in FIG. 2. In that figure, a conveyor belt transports a substrate to a plasma source, where the plasma acts to prepare the surface for sol-gel deposition of the thin film.

The substrate is next transported to a spray cabin, wherein a liquid formulation of the thin film material is applied, e.g., by spraying, to the substrate. The material is then dried, e.g., with infrared radiation, or otherwise treated or cured to give rise to a thin film having the desired thickness. The process is suitably performed at about atmospheric pressure and at or below about 100° C., or even below about 80° C., although higher temperatures may be suitable. In some embodiments, the method is performed at or above about atmospheric pressure. Excess material may be withdrawn at any step in the process, as shown in FIG. 2.

In some embodiments, disposition of the thin film onto the upper surface of the substrate is performed at less than about 200° C. In other embodiments, the disposition is performed at less than about 100° C., or even at less than 80° C. Disposition of thin films at temperatures of less than about 80° C. is preferable, for example, where the substrate is bituminous or asphaltic in nature or may not tolerate extended exposure to higher temperatures.

Disposition is also suitably performed at about or greater than atmospheric pressure, although deposition at reduced pressures is contemplated. Atmospheric or increased-pressure deposition is typically employed where the substrate—e.g., an asphaltic shingle—may be adversely impacted by reduced pressure or vacuum.

Suitable matrix materials are described elsewhere herein. Such materials are suitably capable of transmitting from about 50% to about 100% of radiation having a wavelength in the range of from 300 nm to about 700 nm. The matrix material may be porous or non-porous when it forms the thin films of the claimed invention, although porous matrix materials are considered especially suitable. Users of ordinary skill in the art will encounter little difficulty in adjusting process conditions to achieve a matrix material having a porosity that meets their particular needs.

Suitable nanoparticles are also described elsewhere herein. In typical embodiments, nanoparticles are dispersed in the matrix material or a film-forming material before application to the substrate, although the nanoparticles may be added to the material after deposition. The nanoparticles dispersed within the matrix are typically kept separate from one another, although particle aggregates may be present. Typically, nanoparticles are disposed into the matrix material—or material that forms the matrix material—before deposition onto the substrate.

The nanoparticles may be dispersed in the matrix by known means, such as by mixing, blending, shaking, sonication, and the like. Nanoparticles may also be dispersed into and within the matrix with the assistance of electrical or magnetic fields. Dispersion may also be effected by addition of one or more salts or other chemical compounds to the matrix.

The components of the thin film—inter alia, the matrix material and nanoparticles—are suitably chosen to achieve a roofing article that absorbs less than about 50% of radiation having a wavelength in the range of from about 700 nm to about 2500 nm. In other embodiments, the at least one thin film—or the article as a whole—reflects at least about 50% of radiation having a wavelength of between about 700 nm and about 2500 nm.

The sum of the thin film's percentage transmission of radiation having a wavelength of between about 300 nm and about 700 nm and the thin film's percentage reflectance of radiation having a wavelength of between about 700 nm and about 2500 nm is suitably greater than 50%. The sum of the transmission and reflectance is, in some embodiments, even greater than 65%. The articles also suitably have an emissivity of from about 75% to about 100% in the middle-IR range, or from about 85% to about 95%, or even of about 90%. Such substantial emissivity enables roofing materials made according to the claimed invention to at least partially avoid the "heat island" effect that can arise in sunny weather, as described elsewhere herein.

The nanoparticulate thin films are suitably disposed on to granules, bare shingles, or even onto shingles that already include granules, as shown in FIG. 1. Roofing membranes, shakes, tiles, coil stock, and the like are considered suitable substrates, as are other roofing materials known in the field.

The present methods also include, in some embodiments, the addition of a sealant, a binder, or an adhesive. The addition of such materials may be made to enhance the structural integrity of the roofing articles or, alternatively, to prevent diffusion of components of the thin film into the substrate. The sealant or other agent may be applied to the roofing article by known means such as spraying or roll coating, but may also be incorporated into the thin film or a material that forms the thin film.

Bituminous materials may be used to bind granules to roofing articles, or, in certain embodiments, as a matrix. Suitable bituminous materials are set forth in, e.g., U.S. application Ser. No. 11/163,103 (published as US 2007/0077361A1; allowed on May 27, 2009), the entirety of which is incorporated herein by reference. Other binders—which may, in some embodiments, serve as matrix materials—are set forth in U.S. Pat. No. 7,241,500, the entirety of which is likewise incorporated herein by reference.

As previously described, algaecides, biocides, and the like may also be incorporated into the roofing articles. Such agents are incorporated into the articles at essentially any step in the production process; methods for such incorporation will be apparent to those of ordinary skill in the art.

Roofing articles according to the present invention may also include colorants, pigments, dyes, and the like. Such agents are typically incorporated into the matrix material or a material that forms the matrix material before deposition, but may also be incorporated into the substrate.

The claimed methods may, in some embodiments, include application of clear or colored coatings, which coatings are described elsewhere herein. Such coatings are applied by methods known to those in the field, such as spraying, roll coating, and the like.

The claimed methods also include preparation of the substrate surface before disposition of the thin film atop the substrate. This preparation may include, e.g., cleaning the substrate. Excess granules and foreign matter are typically removed before application of the thin films. This removal may be accomplished by washing, pressure washing, steam cleaning, an air knife, and the like. In some embodiments, the substrate or the thin film includes an adhesive or sealant to bond the substrate and film together. In other embodiments, an adhesive or sealant is disposed between the film and substrate to bond the two.

The claimed invention should not be understood as limited to roofing materials. Opaque building materials, are also within the scope of the invention, such as siding materials, fencing materials, rail materials, decking materials, and the like.

Such materials suitably include a substrate at least partially surmounted by at least one thin film having an average thickness in the range of from about 10 nm to about 5000 nm. The film is suitably from about 100 to about 1000 nm in thickness, from 200 to about 500 nm in thickness, or even about 200 nm in thickness.

The films also suitably include at least one population of nanoparticles residing in a matrix, with at least one of the populations of nanoparticles having at least one characteristic dimension in the range of from about 10 nm to about 500 nm. Such a characteristic dimension can be a length, a width, a diameter, and the like. Suitable cross-sectional dimensions can also be in the range of from about 50 nm to about 200 nm, or even from about 75 nm to about 125 nm. The optimal nanoparticle size will be apparent to the user of ordinary skill in the art, and will be found without undue experimentation.

The article may include nanoparticles that are all of the same size and material, or may include nanoparticles of different sizes, shapes, and materials.

The thin film and nanoparticles suitably transmit at least about 5% of radiation having a wavelength of between about 300 nm and about 700 nm. In some embodiments, the thin film and nanoparticles suitably transmit at least about 20%, at least about 50%, or even at least about 85% of such radiation.

The articles also suitably reflect at least about 20% of radiation having a wavelength of between about 700 nm and about 2500 nm. In some embodiments, the article reflects at least about 30%, at least about 50% or even about 70% of such radiation. The articles also, in some embodiments, have an emissivity of at least about 75% for radiation having a wavelength of greater than about 2500 nm, or even about 85% of such radiation.

EXAMPLES AND NON-LIMITING EMBODIMENTS

In one non-limiting embodiment of the present invention, films of $SiO_2$ containing Ag (10 wt % in ethylene glycol, Aldrich, www.sigmaaldrich.com, St. Louis, Mo., USA), $Fe_2O_3$ (35 wt % in water, Nanostructured and Amorphous Materials, Inc., www.nanoamor.com, Houston, Tex., USA), or $TiO_2$ (30 wt % in water, Evonik Degussa, www.degussa.com, Germany) nanoparticles of a size less than about 100 nm were deposited directly onto 3 inch by 3 inch shingles by spraying about 2 mL of various sols.

A first silica sol used in this embodiment was synthesized by adding 8.57 mL of tetra-ethoxy-silane (TEOS) (99%; VWR Prolabo, www.fr.vwr.com, France) to 60 mL 0.01 mol/L hydrochloric acid (diluted from 1 mol/L; VWR Prolabo, www.fr.vwr.com, France). The mixture was then stirred for 1 hour at 60° C., and the resulting obtained silica was microporous. After cooling, the sol was divided into 10 mL portions into which different amounts (i.e., molar percent) of the aforementioned particles were added.

The solar reflectance ("SR", in percentage) as a function of the relative amount of nanoparticles present in the coating was monitored using the ASTM C-1549 method using a portable solar reflectometer (Devices & Services, Dallas, Tex., USA), and was as follows:

| particle amount (mol %) | SR (%) | L* | a* | b* |
|---|---|---|---|---|
| reference - shingle | 4.1 | 23.8 | 0.1 | 1.2 |
| 5% Ag | 5.5 | 27.1 | 0.1 | 2.7 |
| 14% Ag | 4.8 | 25.5 | 0.0 | 1.7 |
| 5% $Fe_2O_3$ | 5.7 | 26.7 | 2.5 | 3.8 |
| 23% $Fe_2O_3$ | 7.6 | 24.2 | 13.5 | 12.8 |

A second silica sol used in another non-limiting embodiment of the present invention was synthesized by adding 8.57 mL of tetra-ethoxy-silane (TEOS) (99%; VWR Prolabo, www.fr.vwr.com) to 60 mL 0.01 mol/L of hydrochloric acid (diluted from 1 mol/L; VWR Prolabo, www.fr.vwr.com, France). This mixture was stirred for 1 hour at 60° C., after which 5.74 mL of ammonia (20 wt %, diluted with distilled water to 1 mol/L; VWR Prolabo, www.fr.vwr.com, France) was added and the mixture was again stirred for 1 hour at 60° C. The resulting silica was mesoporous.

After cooling, the sol was divided into 10 mL portions into which varying amounts (molar percent) of the aforementioned particles were added. The solar reflectance (SR in %)

as a function of the particle amount was monitored using the ASTM C-1549 method using a portable solar reflectometer (Devices & Services, Dallas, Tex., USA), with the following results:

| particle amount (mol %) | SR (%) | L* | a* | b* |
|---|---|---|---|---|
| reference - shingle | 4.1 | 23.8 | 0.1 | 1.2 |
| 5% Ag | 5.2 | 25.7 | 0.6 | 2.3 |
| 14% Ag | 5.3 | 27.2 | 0.6 | 4.0 |
| 23% Ag | 5.6 | 27.7 | 0.4 | 4.2 |
| 5% $Fe_2O_3$ | 5.4 | 26.1 | 3.8 | 8.9 |
| 23% $Fe_2O_3$ | 6.5 | 23.5 | 10.7 | 11.2 |
| 50% $TiO_2$ | 8.4 | 36.3 | -0.5 | -2.3 |

What is claimed:

1. A roofing article, comprising:
an essentially opaque substrate at least partially surmounted by at least one thin film having an average thickness in the range of from about 20 nm to about 500 nm,
the at least one thin film comprising at least one population of nanoparticles residing in a matrix,
the matrix having a first refractive index,
the at least one population of nanoparticles having a second refractive index,
at least one of the population of nanoparticles having at least one characteristic dimension in the range of from about 10 nm to about 500 nm,
the at least one thin film transmitting at least about 5% of radiation having a wavelength of between about 300 nm and about 700 nm, and
the at least one thin film reflecting at least about 20% of radiation having a wavelength of between about 700 nm and about 2500 nm.

2. The roofing article of claim 1, wherein the roofing article has an emissivity of at least about 75% for radiation having a wavelength in the range of greater than about 2500 nm.

3. The roofing article of claim 1, wherein the at least one thin film absorbs less than about 60% of radiation having a wavelength of between about 300 nm and about 2500 nm.

4. The roofing article of claim 1, wherein the matrix comprises a polymer, silica, a silicate, a phosphate, or any combination thereof.

5. The roofing article of claim 1, wherein the combination of the thin film's percentage transmission of radiation having a wavelength of between about 300 nm and about 700 nm and the thin film's percentage reflectance of radiation having a wavelength of between about 700 nm and about 2500 nm is greater than 50%.

6. The roofing article of claim 1, wherein a nanoparticle is characterized as being spherical, cylindrical, oblong, ovoid, acicular, cubic, hollow, polygonal or any combination thereof.

7. The roofing article of claim 1, wherein a nanoparticle comprises a high-index material, a metal, a metal oxide, a conducting material, a semiconducting material, or any combination thereof.

8. The roofing article of claim 7, wherein the metal comprises aluminum, silver, gold, or any combination thereof.

9. The roofing article of claim 7, wherein the nanoparticle comprises $LaB_6$, a metal oxide selected from the group consisting of $SnO_2$:F, $In_2O_3$:Sn, ZnO:Al, or any combination thereof.

10. The roofing article of claim 7, wherein the high-index material comprises $TiO_2$, $Fe_2O_3$, or any combination thereof.

11. The roofing article of claim 7, wherein the high-index material comprises a material having a refractive index of at least about 2.

12. The roofing article of claim 1, wherein the difference between the first refractive index and the second refractive index is at least about 1.

13. The roofing article of claim 1, wherein the roofing article has an L* value of less than about 65.

14. The roofing article of claim 1, wherein the roofing article comprises a sealant, an algaecide, a biocide, or my combination thereof.

15. A method of fabricating a building material, comprising:
disposing onto at least a portion of an essentially opaque substrate at least one thin film having an average thickness in the range of from about 20 nm to about 500 nm,
the at least one thin film comprising at least one matrix and a population of nanoparticles,
at least one nanoparticle having at least one average characteristic dimension in the range of from about 10 nm to about 500 nm,
the at least one thin film transmitting from about 5% to about 100% of radiation having a wavelength of between about 300 nm and about 700 nm,
the at least one thin film reflecting at least about 20% of radiation having a wavelength of between about 700 nm and about 2500 nm.

16. The method of claim 15, wherein the at least one film is disposed onto the upper surface of the substrate by spraying, sol-gel spraying, electrospraying, laminating, fluidized bed processing, or any combination thereof.

17. The method of claim 15, wherein the disposing of the at least one thin film onto the upper surface of the substrate is performed at less than about 100° C.

18. A roofing article, comprising:
an essentially opaque substrate at least partially surmounted by a thin film having an average thickness in the range of from about 20 nm to about 500 nm,
the at least one thin film comprising a matrix and at least one population of nanoparticles,
at least one of the population of nanoparticles having at least one characteristic dimension in the range of from about 10 nm to about 500 nm,
the at least one thin film transmitting at least about 5% of radiation having a wavelength of between about 300 nm and about 700 nm, and
the at least one thin film reflecting at least about 20% of radiation having a wavelength of between about 700 nm and about 2500 nm.

19. The roofing article of claim 18, wherein the roofing article has an emissivity of at least about 75% for radiation having a wavelength of at least about 2500 nm.

20. A method of fabricating a roofing article, comprising:
spraying a sol onto at least a portion of a shingle,
the sol comprising a matrix and at least one population of nanoparticles,
at least one of the population of nanoparticles having at least one characteristic dimension in the range of from about 10 nm to about 500 nm,
processing the sol to give rise to a thin film having a thickness in the range of from about 50 nm to about 200 nm,
the at least one thin film transmitting at least about 5% of radiation having a wavelength of between about 300 nm and about 700 nm, and the at least one thin film reflecting at least about 20% of radiation having a wavelength of between about 700 nm and about 2500 nm.

21. The method of claim 20, wherein the roofing article has an emissivity of at least about 75% for radiation having a wavelength of at least about 2500 nm.

22. An opaque building material, comprising:
an essentially opaque substrate at least partially surmounted by at least one thin film having an average thickness in the range of from about 20 nm to about 500 nm,
the at least one thin film comprising at least one population of nanoparticles residing in a matrix,
at least one of the population of nanoparticles having at least one characteristic dimension in the range of from about 10 nm to about 500 nm,
the at least one thin film transmitting at least about 5% of radiation having a wavelength of between about 300 nm and about 700 nm, and
the at least one thin film reflecting at least about 20% of radiation having a wavelength of between about 700 nm and about 2500 nm.

23. The opaque building material of claim 22, wherein the opaque building material is selected from the group consisting of roofing materials, siding materials, fencing materials, rail materials, and decking materials.

24. The opaque building material of claim 22, wherein the opaque building material has an emissivity of at least about 75% for radiation having a wavelength of greater than about 2500 nm.

25. The roofing article of claim 18, wherein the thin film has an average thickness in the range of from about 200 nm to about 500 nm.

26. The roofing material of claim 22, wherein the thin film has an average thickness in the range of from about 200 nm to about 500 nm.

27. The roofing material of claim 1, wherein the thin film at least partially surmounts one or more granules.

28. The roofing material of claim 18, wherein the thin film at least partially surmounts one or more granules.

29. The roofing article of claim 18, further comprising a sealant, an algaecide, a biocide, or my combination thereof.

30. The opaque building material of claim 22, further comprising a sealant, an algaecide, a biocide, or my combination thereof.

* * * * *